Figure 1:
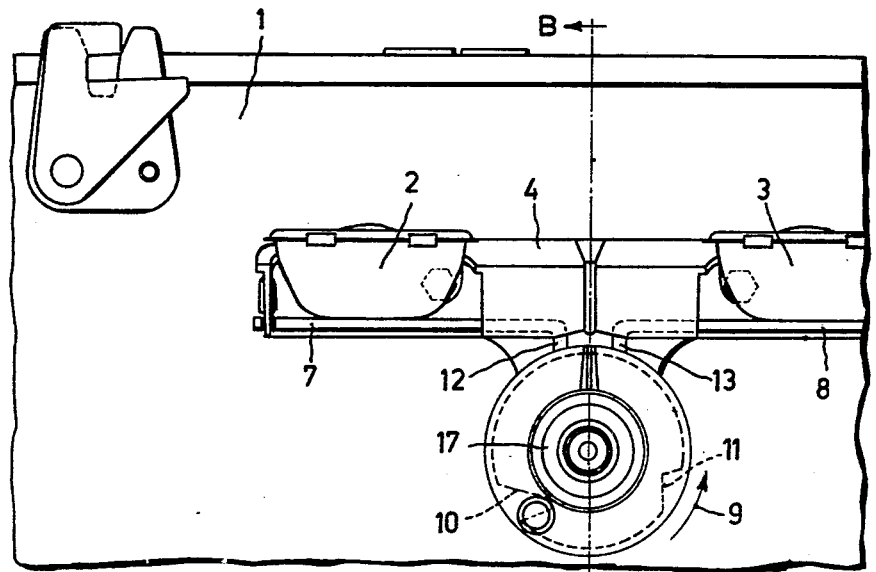

Oct. 27, 1964       M. AUBERT       3,154,218
ARRANGEMENT FOR ADDING CONTROLLED AMOUNTS OF WASHING INGREDIENTS
AND/OR DETERGENTS TO THE WASHING LIQUID OF WASHING MACHINES
PARTICULARLY DISH-WASHING MACHINES
Filed Aug. 7, 1962       2 Sheets-Sheet 1

INVENTOR
*MICHEL AUBERT*

BY.
AGENT

Oct. 27, 1964 M. AUBERT 3,154,218
ARRANGEMENT FOR ADDING CONTROLLED AMOUNTS OF WASHING INGREDIENTS
AND/OR DETERGENTS TO THE WASHING LIQUID OF WASHING MACHINES
PARTICULARLY DISH-WASHING MACHINES
Filed Aug. 7, 1962 2 Sheets-Sheet 2

INVENTOR
*MICHEL AUBERT*

BY
AGENT

United States Patent Office 3,154,218
Patented Oct. 27, 1964

1

3,154,218
ARRANGEMENT FOR ADDING CONTROLLED
AMOUNTS OF WASHING INGREDIENTS AND/
OR DETERGENTS TO THE WASHING LIQUID
OF WASHING MACHINES PARTICULARLY
DISH-WASHING MACHINES
Michel Aubert, Geneva, Switzerland, assignor to Frame
Societe Anonyme, Fribourg, Switzerland
Filed Aug. 7, 1962, Ser. No. 215,342
6 Claims. (Cl. 222—70)

In modern washing machines, particularly dish-washing machines, washing ingredients and/or detergents have to be added to the washing liquid during the washing process, that is to say, when the machines are operating and not open. For this purpose additional pumps or similar cylinder and piston arrangements are known. However, they are frequently too expensive, at least for use in domestic machines, especially if more than one washing ingredient or detergent has to be added and further they are useless if the washing ingredients or detergents are powdered. In dish-washing machines it is known to provide in the chamber for the dishes to be cleaned containers which are adapted to be tilted from without or, if the addition is to be performed at a predetermined instant of the washing process, are tilted automatically by a driving unit controlled by a timing device and then dump their contents into the chamber. The said containers are filled with the washing ingredients and/or detergents before the washing process is started and generally are closed by a cover which opens during tilting, enabling the contents of the container to be dumped into the chamber. However, with this known arrangement only one substance at a time, that is to say a washing ingredient and/or a detergent, can be added, but frequently it is required that at least two substances be added to the washing liquid, first a washing ingredient and then a detergent.

It is the object of the present invention to provide an arrangement for adding controlled amounts of washing ingredients and/or detergents to the washing liquids of washing machines, particularly dish-washing machines, with the aid of which at predetermined instants two different substances may simply be added to the washing liquid.

The invention relates to an arrangement for the addition of controlled amounts of washing ingredients and/or detergents to the washing liquid of washing machines, particularly dish-washing machines, provided with containers for the washing ingredients and/or detergents to be added which are disposed in the chamber of the washing machine, are adapted to be tilted for dumping their contents into the chamber and are closed by covers. According to the invention such an arrangement is characterized by a supporting frame having a central control disc driven by a driving unit controlled by a timing device, and by shafts engaging the control disc on either side and provided with containers for the washing ingredients and/or detergents which are rigidly secured to the shafts and are adapted to be tilted by rotation of the shafts, the control disc wall having gaps which cause or permit sequential rotation of the shafts.

In a preferred embodiment the shafts to which the containers for receiving the washing ingredients and/or detergents are rigidly secured extend at right angles to the axis of the control disc and have crank-like bent parts which engage in at least one guiding groove of the control disc. Further the containers for receiving the washing ingredients and/or detergents are preferably eccentrically secured to the respective shafts so that gravity exerts a torque upon the shafts which tends to tilt the containers, and preferably the walls of the guiding grooves of the control disc are provided with gaps which release the

2 bent portions of the shafts to which the containers are secured when the said gaps during the rotation of the control disc occupy the associated positions so that the containers are tilted. To enable the tilted containers to be simply returned to their upright position and to be filled again with the washing ingredient and/or detergent the shafts to which the containers are secured are preferably journalled in slots at the ends at which the bent parts are formed, thus permitting the shafts to be lifted and hence the tilted containers to be returned to their upright positions while the bent portions of the shafts engage again in the guiding groove or grooves of the control disc. The control disc is preferably adapted to be manually returned to its zero position with the aid of a rotary knob or the like.

As has been mentioned hereinbefore, the containers generally have covers so that the splashing washing liquid cannot come into contact with the contents of the containers before the latter are tilted. This is simply made possible by hinging the covers to the front rims of the containers so that they are opened when the containers are tilted.

One of the principal advantages of the present invention especially consist in that in the arrangement in accordance with the invention for adding controlled amounts of washing ingredients and/or detergents several washing ingredients and/or detergents may simply be added without complicated devices, for example, addition pumps or the like, being required. By suitable shaping of the control disc the addition may readily be adapted to the course of the washing process, for example, with the aid of a control disc drive controlled by a timing device.

Figure 2:
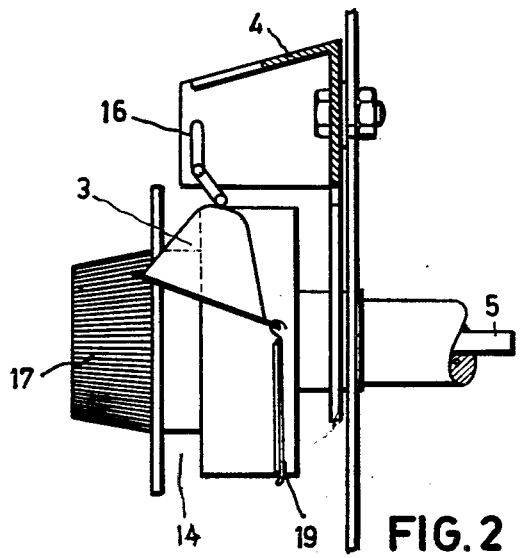
Figure 3:
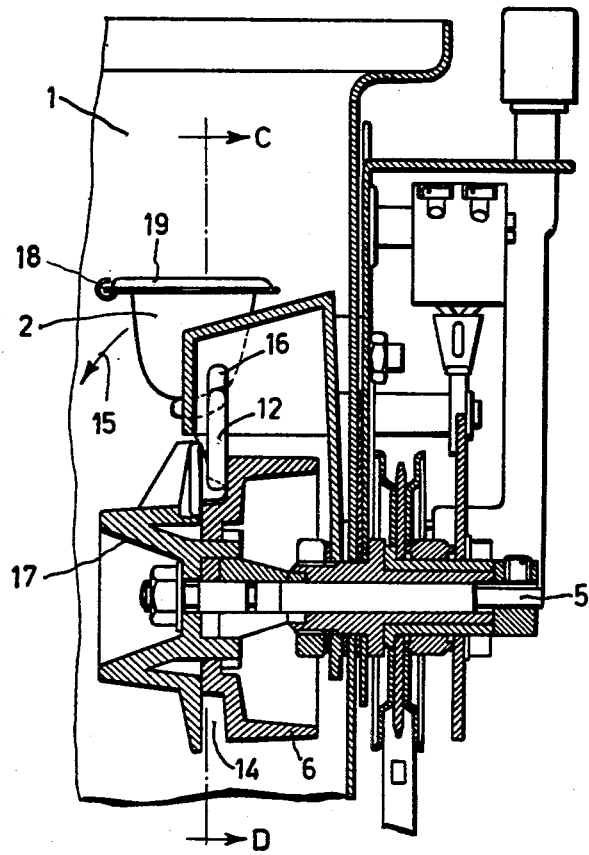
Figure 4:
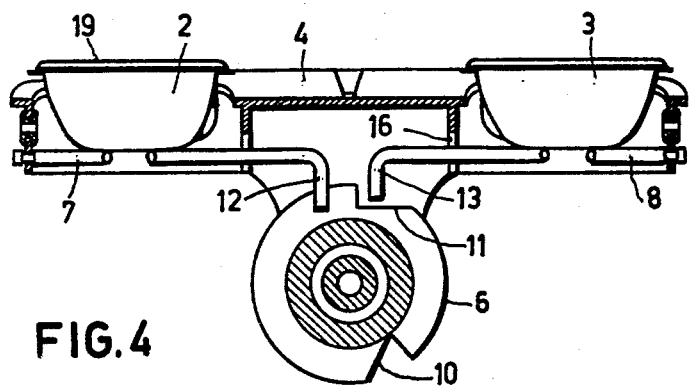

The invention will now be described more fully with reference to a drawing in which an embodiment is shown by way of example only and in which:

FIGURE 1 is a front elevation of a device in accordance with the invention for adding controlled amounts of washing ingredients and/or detergents, FIGURE 2 is a side elevation of a slightly modified form of the arrangement shown in FIGURE 1, partially in section, FIGURE 3 is a sectional view of the arrangement shown in FIGURE 1 taken on a line A—B, and FIGURE 4 is a sectional view of the arrangement shown in FIGURE 3 taken on a line C—D.

The arrangement shown in the figures is used for adding controlled amounts of washing ingredients and/or detergents to the washing liquid of washing machines, particularly dish-washing machines. The arrangement includes containers 2, 3 for receiving the washing ingredients and/or detergents which are disposed in a chamber 1 of the washing machines and are adapted to be tilted in order to dump their contents into the chamber 1. For this purpose a supporting frame 4 is provided with a central control disc 6 which through a shaft 5 is driven by a driving unit controlled by a timing device.

Shafts 7 and 8 engage the control disc 6, each on one side. Containers 2 and 3 for receiving the washing ingredient and/or detergent are secured to the shafts so as to be adapted to be tilted by rotation of the shafts 7 and 8 in the direction of an arrow 9. The control disc 6 has gaps 10 and 11 in its wall which cause, or in the embodiment shown permit, the shafts 7 and 8 to rotate in succession. In the embodiment shown the shafts 7 and 8 extend at right angles to the axis or shaft 5 of the control disc 6 and have crank-like bent portions 12 and 13 which engage in a guiding groove 14 of the control disc 6 and are of different lengths so that, for example, only the gap 10 of the control disc 6 releases the crank-like bent portion 12, enabling the container 2 to dump its contents, for example, the washing ingredient into the chamber 1. Similarly only when the gap 11 reaches the crank-like bent portion 13 the container 3 is tilted about the shaft 8 and dumps its contents, for example, the detergent, into the chamber 1. The containers 2 and 3 are eccentrically secured to the respective shafts 7 and 8. See particularly FIGURES 2 and 3, so that the force of gravitation exerts a torque on the shafts 7 and 8 in the direction of an arrow 15 and hence the bent portions 12 and 13 of the shafts 7 and 8 to which the containers 2 and 2 are secured are released by the gaps 10 and 11 of the guiding groove 14 with the result that the containers 2 and 3 are tilted. Thus during rotation of the control disc 6, first the container 2 and then the container 3 is tilted with a time interval adjustable according to the spacing between the gaps 10 and 11 of the control disc 6 and the speed of the disc. When the containers are tilted covers 19 hinged to the front edges 18 of the containers are opened and permit the washing ingredient or detergent to slide into the washing liquid.

To return the tilted containers 2 and 3 to their upright positions the shafts 7 and 8 (see FIGURE 3), at the ends of which the bent portions 12 and 13 are provided, are journalled in slots 16 in the frame 4 so that they may be lifted. This enables the tilted containers 2 and 3 to be returned to the upright position while at the same time the bent portions 12 and 13 may be introduced again into the guiding groove 14 of the control disc 6. The control disc 6 may manually be returned to its zero position with the aid of a rotary knob 17.

What is claimed is:

1. A device for dispensing controlled amounts of dishwasher chemicals comprising at least two containers for said chemicals, means for releasing said containers to tilt the same sequentially whereby the ingredients therein are dumped into the dishwasher, a supporting frame for said containers provided with a central control disc, said disc having spaced recesses therein, a timing device, a driving unit, each of said containers being provided with a shaft which engages at one end with said control disc, said central control disc being driven by said driving unit and controlled by said timing device, and said disc releasing said containers in a predetermined sequence when the ends of the shafts drop into recesses in said central control disc to be tilted upon rotation of said shafts.

2. A device for dispensing controlled amounts of dishwasher chemical comprising at least two containers for said chemicals, means for releasing said containers to tilt the same sequentially whereby the ingredients therein are dumped into the dishwasher, a supporting frame for said containers provided with a central control disc, said disc having a guide groove and spaced recesses in said groove, a timing device, a driving unit, each of said containers being provided with a shaft that extends substantially perpendicular to the central longitudinal axis of said control disc and has a crank-like end portion located in said guide groove of the control disc, the latter being driven by said driving unit and controlled by said timing device, said control disc releasing said containers in a predetermined sequence when the ends of the shafts drop into the recesses in said central control disc to be tilted upon rotation of said shafts.

3. A device for dispensing controlled amounts of dishwasher chemicals as claimed in claim 1 wherein said containers are eccentrically mounted on corresponding shafts so that the force of gravity exerts a force on said shafts to thereby tilt the containers.

4. A device for dispensing controlled amounts of dishwasher chemicals as claimed in claim 2 further comprising slots in said supporting frame, and the crank-like ends of said shafts being journalled in said slots whereby said shafts may be lifted and the tilted containers returned to the upright position thereof.

5. A device for dispensing controlled amounts of dishwasher chemicals as claimed in claim 1 wherein said control disc is adapted to be manually returned to its zero position.

6. A device for dispensing controlled amounts of dishwashing chemicals as claim 1 wherein said containers are further provided with covers hinged to their front edges.

References Cited in the file of this patent

UNITED STATES PATENTS

| | | |
|---|---|---|
| 2,762,527 | Manley | Sept. 11, 1956 |
| 3,038,640 | Braga et al. | June 12, 1962 |
| 3,038,641 | Buzickey et al. | June 12, 1962 |
| 3,062,412 | Cushing | Nov. 6, 1962 |
| 3,092,124 | Flynn | June 4, 1963 |